(12) United States Patent
Li

(10) Patent No.: US 10,167,357 B2
(45) Date of Patent: Jan. 1, 2019

(54) MULTI-BASE MATERIAL ADAPTIVITY PULLING REMOVAL TYPE BINDER PRODUCT, BINDER COMPOSITION AND ASSEMBLY

(71) Applicant: 3M INNOVATIVE PROPERTIES COMPANY, St. Paul, MN (US)

(72) Inventor: Jun Li, Shanghai (CN)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 15/520,907

(22) PCT Filed: Dec. 21, 2015

(86) PCT No.: PCT/US2015/066964
§ 371 (c)(1),
(2) Date: Apr. 21, 2017

(87) PCT Pub. No.: WO2016/109270
PCT Pub. Date: Jul. 7, 2016

(65) Prior Publication Data
US 2017/0335038 A1    Nov. 23, 2017

(30) Foreign Application Priority Data
Dec. 31, 2014 (CN) .......................... 2014 1 0855590

(51) Int. Cl.
*C09J 133/02* (2006.01)
*C08L 53/02* (2006.01)
(Continued)

(52) U.S. Cl.
CPC ........ *C08F 220/06* (2013.01); *C08G 18/4063* (2013.01); *C08G 18/6254* (2013.01);
(Continued)

(58) Field of Classification Search
None
See application file for complete search history.

(56) References Cited

U.S. PATENT DOCUMENTS

| 4,024,312 A | 5/1977 | Korpman |
| 5,491,012 A | 2/1996 | Luhmann et al. |

(Continued)

FOREIGN PATENT DOCUMENTS

| WO | WO 03/018702 | 3/2003 |
| WO | WO 2010/002557 | 1/2010 |

(Continued)

OTHER PUBLICATIONS

Adhesion Science and Engineering—I: "The Mechanics of Adhesion", edited by D.A. Dillard and A.V. Pocius, publsihed by Elsevier Science B.V., Amsterdam, The Netherlands, 2002, p. 798.*

(Continued)

*Primary Examiner* — Vu A Nguyen
(74) *Attorney, Agent, or Firm* — Steven A. Bern; Philip Y. Dahl

(57) ABSTRACT

The present disclosure provides a multi-base material adaptivity pulling removal type binder product, a binder compositon and an assembly. The binder product contains an acrylic acid copolymer, a flexibilizer, tackifying resin and an isocyanate curing agent. The binder product comprises a binder layer formed by curing at least a part of the binder composition. The assembly is formed by bonding the binder layer. The binder can be used for firmly bonding various base materials, comprising both high surface energy base materials and low surface energy base materials; meanwhile, the binder can be pulled and removed from the base materials at a large angle. The binder is particularly suitable for the fields of smartphones, tablet computers and a newly developing electronic market.

16 Claims, 1 Drawing Sheet

(51) Int. Cl.
- *C08G 18/40* (2006.01)
- *C08G 18/62* (2006.01)
- *C08G 18/69* (2006.01)
- *C08F 220/06* (2006.01)
- *C09J 175/04* (2006.01)
- *C08L 19/00* (2006.01)
- *C08L 93/04* (2006.01)

(52) U.S. Cl.
CPC ............ *C08G 18/69* (2013.01); *C08L 19/006* (2013.01); *C08L 53/02* (2013.01); *C08L 93/04* (2013.01); *C09J 133/02* (2013.01); *C09J 175/04* (2013.01)

(56) References Cited

U.S. PATENT DOCUMENTS

| | | | |
|---|---|---|---|
| 8,530,578 B2 * | 9/2013 | Bharti | C08F 290/042 525/191 |
| 2008/0271846 A1 | 11/2008 | Krawinkel et al. | |
| 2011/0104486 A1 | 5/2011 | Ma et al. | |

FOREIGN PATENT DOCUMENTS

| WO | WO 2010002667 A1 * | 1/2010 | ............ C09J 133/08 |
|---|---|---|---|
| WO | WO 2011/062851 | 5/2011 | |

OTHER PUBLICATIONS

PCT International Search Report from PCT/US2015/066964; dated Mar. 21, 2016, 4 pages.

* cited by examiner

MULTI-BASE MATERIAL ADAPTIVITY PULLING REMOVAL TYPE BINDER PRODUCT, BINDER COMPOSITION AND ASSEMBLY

FIELD

The present disclosure relates to a binder. Particularly, the present disclosure relates to a multi-base material adaptivity pulling removal type binder product, a binder composition capable of being used for preparing the binder product and an assembly formed by bonding.

BACKGROUND

Although the condition that the performance of a binder can be improved by using a tackifier and a thickener is a known fact, and respective components of a binder formula are possibly known, but aiming at the specifically required final use requirements, the problem of how to select combination of specific binder components and relative quantity thereof still faces great challenge, which is caused by the fact that balance of required performances is very difficult to achieve.

In the technical field of the binder formula, the requirement of realizing a bonding action aiming at various base materials always exists, and the base materials comprise base with low surface energy and base materials with high surface energy. Although existing binders can provide proper performances aiming at certain base materials, but more choices are still required actually to meet certain critical requirements. For example, in some application occasions, it is required that the binder should have better adaptivity to both the base materials with low surface energy and the base materials with high surface energy (namely, multi-base material adaptivity). Besides, in certain application occasions, it is hoped that the binder can be removed by pulling, which requires that the bonding strength intensity of the binder can be obviously reduced while the binder is pulled along the bonded base material. In home furnishing, electronic, industrial and other fields, an application requirement on such multi-base material adaptivity pull removal type binders exists.

In application of electronics industry (particularly smartphones and tablet computers), there are also some new requirements. In such application, various base materials to be bonded are related, are possibly subject to different surface treatments, have high or low surface energy and have the characteristic of ultrathin thickness. For these applications, the key requirements comprise: the binder can be reliably removed through vertical pulling, and has better moisture/heat/aging resistance at the same time. The constituting and structures of the binders in the prior art hardly meet the new application requirements in the electronics industry.

Therefore, a new selectable binder is needed.

SUMMARY

The present disclosure provides a multi-base material adaptivity pulling removal type binder product, a binder composition capable of being used for preparing the binder product and an assembly formed by bonding. The binder product can be used for firmly bonding various base materials, and can be pulled and removed from the base materials at large angles, namely, the binder has the physical property of "reducing bonding strength by pulling", so the binder can be removed from the bonded base materials by pulling. In addition, the binder has the performance of obviously improving damp/heat/aging resistance. The pulling removal binder is widely applied in home furnishing, electronic, industrial and other fields, and is particularly suitable for the application requirements of smartphones, tablet computer and newly-developing electronic markets, for example, can be used for mounting and detaching (repairing or replacing) of batteries or electronic parts (such as a touch screen).

In one aspect, the present disclosure provides a binder composition, comprising: an acrylic acid copolymer, comprising a (methyl)acrylate monomer unit and a vinyl carboxylic acid comonomer unit; a flexibilizer, comprising a functional group selected from a hydroxide radical, a carboxyl group and an amino group, wherein the flexibilizer has a non-polar carbon chain; a tackifying resin, comprising a high-Tg tackifying resin with a Tg of at least 20° C. and a low-Tg tackifying resin with a Tg of not more than 0° C.; and an isocyanate curing agent. In some embodiments, a number average molecular weight Mn of the acrylic acid copolymer is lower than 500,000 g/mol and the Tg is lower than −30° C.

In some embodiments, the acrylic acid copolymer comprises the vinyl carboxylic acid copolymer unit in the amount ranging from 3 wt % to 8 wt %. In some embodiments, the binder composition comprises the acrylic acid copolymer in the amount ranging from 20 wt % to 50 wt %. In some embodiments, the non-polar carbon chain of the flexibilizer is derived from unsaturated alkene.

In some embodiments, the flexibilizer comprises the combination of hydroxy-terminated polybutadiene and SBS rubber. In some embodiments, a hydroxyl content of the hydroxy-terminated polybutadiene is at least 1 mmol/g. In some embodiments, a number average molecular weight Mn of the hydroxy-terminated polybutadiene is between 2300 g/mol and 4500 g/mol.

In some embodiments, the hydroxyl-terminated polybutadiene is present in an amount ranging from 20 wt % to 50 wt % based on the weight of the acrylic acid copolymer. In some embodiments, the binder composition comprises the SBS rubber in an amount ranging from 5 wt % to 35 wt %. In some embodiments, the binder composition comprises the flexibilizer in an amount of not more than 65 wt %. In some embodiments, the binder composition comprises the flexibilizer in an amount ranging from 10 wt % to 65 wt %.

In some embodiments, the Tg of the high-Tg tackifying resin is at least 85° C. and the Tg of the low-Tg tackifying resin is not more than −20° C. In some embodiments, a weight ratio of the high-Tg tackifying resin to the low-Tg tackifying resin ranges from 1:1 to 8:1. In some embodiments, a weight ratio of the high-Tg tackifying resin to the low-Tg tackifying resin ranges from 2:1 to 4:1. In some embodiments, the binder composition comprises the tackifying resin in an amount ranging from 30 wt % to 45 wt %.

In some embodiments, the isocyanate curing agent is present in an amount ranging from more than 0 wt % to not more than 3 wt % based on the weight of the acrylic acid copolymer. In some embodiments, the isocyanate curing agent is present in an amount of at least 5 wt % based on the weight of the hydroxy-terminated polybutadiene.

In some embodiments, the binder composition comprises: the acrylic acid copolymer in an amount ranging from 20 wt % to 50 wt %, the flexibilizer in an amount ranging from 10 wt % to 65 wt %, the tackifying resin in the amount ranging from 30 wt % to 45 wt %, and the isocyanate curing agent in the amount ranging from more than 0 wt % to not more than 3 wt % based on the weight of the acrylic acid copolymer.

In another aspect, the present disclosure provides a binder product, comprising a binder layer formed by curing at least a part of the binder composition in any one of aforementioned embodiments. In some embodiments, the binder product further comprises: a carrier, wherein the binder layer is disposed on one side of the carrier, or the binder layers are respectively disposed on two opposing sides of the carrier; and an isolation layer optionally covering an exposed surfaced of the binder layer. In some embodiments, the carrier contains an elastomer with a non-polar carbon chain. In some embodiments, the elastomer is selected from SBS, SEPS, SIS and isocyanate-crosslinked hydroxy-terminated polybutadiene.

In some embodiments, when a test is performed according to an initial viscosity test standard PSTC-6, a ratio of an initial viscosity of the binder product under a non-pulling state to an initial viscosity when the binder product is pulled to a strain of 300% is more than 3. In some embodiments, when a test is performed according to an initial viscosity test standard PSTC-6, a ratio of an initial viscosity of the binder product under a non-pulling state to an initial viscosity when the binder product is pulled to a strain of 300% is more than 5.

In some embodiments, after being aged for 72 hours under the condition of 65° C. and relative humidity of 95%, a test is performed according to an initial viscosity test standard PSTC-6, and a ratio of an initial viscosity of the binder product under a non-pulling state to an initial viscosity when the binder product is pulled to a strain of 300% is more than 2.4. In some embodiments, after being aged for 72 hours under the condition of 65° C. and relative humidity of 95%, a test is performed according to an initial viscosity test standard PSTC-6, and a ratio of an initial viscosity of the binder product under a non-pulling state to an initial viscosity when the binder product is pulled to a strain of 300% is kept more than 5.

In another aspect, the present disclosure provides a method for preparing a binder product, comprising following steps: providing the binder composition according to any one of aforementioned embodiments positioned in a liquid medium, and obtaining a coating liquid; coating the coating liquid on one side or two opposite sides of a carrier, and forming a coating; and curing at least a part of the coating and forming a binder layer. In some embodiments, the liquid medium is selected from an organic inert solvent and the carrier comprises an elastomer with a non-polar carbon chain.

In yet another aspect, the present disclosure provides an adhesive tape, comprising: a carrier containing an elastomer, and a binder layer disposed on one side or two opposing sides of the carrier, the binder layer is formed by the binder composition and the binder composition comprises: an acrylic acid copolymer in an amount ranging from 20 wt % to 50 wt %, comprising a (methyl)acrylate monomer unit and a vinyl carboxylic acid comonomer unit in an amount ranging from 3 wt % to 8 wt %; a flexibilizer in an amount ranging from 10 wt % to 65 wt %, comprising a combination of hydroxy-terminated polybutadiene and SBS rubber; a tackifying resin in an amount ranging from 30 wt % to 45 wt %, comprising a high-Tg tackifying resin with a Tg of at least 20° C. and a low-Tg tackifying resin with a Tg of not more than 0° C., wherein a weight ratio of the high-Tg tackifying resin and the low-Tg tackifying resin ranges from 1:1 to 1:8; and an isocyanate curing agent, wherein the isocyanate curing agent is present in an amount of not more than 3 wt % of the weight of the acrylic acid copolymer and in an amount that is least 5 wt % of the weight of the hydroxy-terminated polybutadiene.

In some embodiments, the acrylic copolymer has a number average molecular weight Mn lower than 500,000 g/mol and a Tg lower than −30° C. In some embodiments, a hydroxyl content of the hydroxy-terminated polybutadiene is between 1 mmol/g to 1.5 mmol/g, number average molecular weight ranges from 2300 g/mol to 4500 g/mol, and the hydroxyl-terminated polybutadiene is present in an amount ranging from 20 wt % to 50 wt % based on the weight of the acrylic acid copolymer; wherein the binder composition comprises the SBS rubber in an amount ranging from 5 wt % to 35 wt %. In some embodiments, the Tg of the high-Tg tackifying resin is at least 85° C. and the Tg of the low-Tg tackifying resin is not more than −20° C., and a weight ratio of the high-Tg tackifying resin to the low-Tg tackifying resin ranges from 2:1 to 4:1. In some embodiments, the elastomer is selected from SBS, SEPS, SIS and isocyanate-crosslinked hydroxy-terminated polybutadiene.

In still another aspect, the present disclosure provides an assembly, comprising a first base material, a second base material and a binder layer for bonding the first base material and the second base material together, wherein the binder is formed by curing at least a part of the binder composition according to any of the aforementioned embodiments. In some embodiments, the first base material and the second base material are respectively independently selected from low surface energy base materials with a surface energy ranging from 20 dyne to 35 dyne and high surface energy base materials with a surface energy higher than 35 dyne. In some embodiments, the first base material and the second base material are respectively independently selected from metal, ceramic, polymer, glass and ink surface. In some embodiments, the binder layer can be removed from the first base material and/or the second base material by pulling.

DETAILED DESCRIPTION OF EMBODIMENTS

Figure 1:
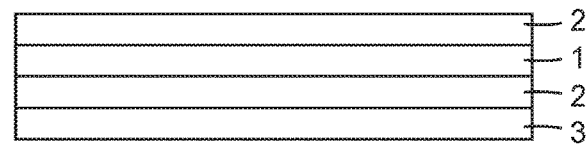
FIG. 1 is a schematic diagram of one embodiment of a binder product of the present disclosure.

The present disclosure provides more detail in combination with drawings and specific embodiments. These embodiments are exemplary and intended to describe the present disclosure in manner allowing those skilled in the art to understand the present disclosure, but details thereof should not be understood as limiting the present disclosure.

Binder Composition

The binder composition of the present disclosure contains an acrylic acid copolymer, a flexibilizer, tackifying resin and an isocyanate curing agent.

Acrylic Acid Copolymer

The acrylic acid copolymer capable being used for the present disclosure contains a (methyl)acrylate monomer unit and a vinyl carboxylic acid comonomer unit.

The term "copolymer" refers to a copolymer formed by copolymerization of at least two different monomers, comprising a random copolymer, a segmented copolymer, a grafted copolymer, an alternating copolymer or a mixture thereof.

The term "(methyl)acrylate" refers to acrylate and/or methacrylate.

The term "monomer unit" refers to a largest structural unit formed by single monomer molecules in a copolymer structure.

The terms "binder" and "binder composition" are used herein interchangeably.

The number average molecular weight Mn of the acrylic acid copolymer is usually lower than 500,000, preferably lower than 400,000 and more preferably in a range of 250,000-350,000. Tg of the acrylic acid copolymer is preferably lower than −30° C. and more preferably lower than −35° C. Tg refers to glass-transition temperature and can be detected by a differential scanning calorimetry (DSC) method.

The acrylic acid copolymer capable of being for the present disclosure comprises those acrylate-vinyl carboxylic acid copolymers, which are usually used for a binder and can be prepared according to a document, for example, the acrylic acid copolymer described in US 2011/0104486, and can be commercially available, for example, from SK-Dyne® 1717 DT of company Soken Kagaku.

Some exemplary (methyl)acrylates capable of being for preparing the acrylic acid copolymer of the present disclosure comprise but are not limited to (methyl) acrylic acid alkyl ester. The term "alkyl" refers to a monad group of alkane, and can be linear, branched, and cyclic or combination thereof, and usually has 1-20 carbon atoms. In some embodiments, the alkyl contains 1-18, 1-12, 1-10, 1-8, 1-6 or 1-4 carbon atoms. Examples of the alkyl comprise but are not limited to: methyl, ethyl, n-propyl, iso-propyl, n-butyl, iso-butyl, t-butyl, n-amyl, n-hexyl, cyclohexyl, n-heptyl, n-octyl and ethylhexyl.

Some exemplary vinyl carboxylic acids capable of being for preparing the acrylic acid copolymer of the present disclosure comprise but are not limited to acrylic acid, methacrylic acid, itaconic acid, maleic acid, fumaric acid and acrylic acid-β-carboxyl ethyl ester. Generally speaking, the acrylic acid copolymer of the present disclosure contains the vinyl carboxylic acid comonomer unit of at least 3 weight % (wt %) or at least 4 wt %. Usually, the acrylic acid copolymer of the present disclosure contains the vinyl carboxylic acid comonomer unit which is not more than 10 wt %, even not more than 8 wt %, or not more than 5 wt %. Preferably, the acrylic acid copolymer of the present disclosure contains the vinyl carboxylic acid comonomer unit of 3-8 wt %.

The binder composition can contain the acrylic acid copolymer of 20-50 wt %. For example, calculated relative to the weight of the binder composition, the quantity of the acrylic acid copolymer can be 20 wt %, 25 wt %, 30 wt %, 35 wt %, 40 wt %, 45 wt % or 50 wt %.

Flexibilizer

The flexibilizer capable of being used for the present disclosure contains a functional group selected from a hydroxide radical, a carboxyl group and an amino group (these functional groups are all polar functional groups) and has a non-polar carbon chain. Preferably, the functional group is positioned at the terminal of a molecular chain of the flexibilizer.

The term "non-polar carbon chain" refers to a polymer chain which takes a carbon chain formed by a plurality of connected carbon atoms as a basic structure and contains no polar functional groups or side chains. The non-polar carbon chain of the flexibilizer is preferably derived and selected from unsaturated alkenes, such as butadiene, ethylene, pentadiene or combination thereof.

In the present disclosure, besides the function of improving the tenacity of a cured product, the flexibilizer also achieves a bridging agent. Molecular polarity has great influence on substance dissoluvability. Polar molecules are easily dissolved in polar solvents and non-polar molecules are easily dissolved in non-polar solvents, namely, "similarity and intermiscibility". Wherein, the flexibilizer has a non-polar carbon chain, and thus can be better compatible with other non-polar components in the composition. If the flexibilizer also comprises styrene-butadiene-styrene (SBS rubber), the non-polar carbon chain of the flexibilizer can be better compatible with SBS rubber. Meanwhile, since the flexibilizer contains the functional group selected from the hydroxide radical, the carboxyl group and the amino group (for example, a terminated functional group), the flexibilizer can react with a crosslinking agent and can be chemically combined in a polyacrylic acid system.

Preferably, the flexibilizer contains combination of hydroxy-terminated polydiene (particularly hydroxy-terminated polybutadiene, namely HTPB) and polystyrene-butadiene-styrene (SBS rubber).

The hydroxyl content of the hydroxy-terminated polydiene (such as HTPB) is preferably at least 1 mmol/g. Generally, the hydroxyl content of hydroxy-terminated polydiene (such as HTPB) is not more than 1.5 mmol/g. The term "hydroxyl content" refers to the mole number of hydroxyl groups contained in resin per gram.

The number average molecular weight Mn of the hydroxy-terminated polydiene (such as HTPB) is preferably 2300-4500, for example, about 2500, 2800, 3000, 3500, 4000.

The hydroxy-terminated polydiene may be commercially available, for example, under the trade designation "Qilong HTPB" from Qilong Chemical Co., Ltd. Calculated relative to the weight of the acrylic acid copolymer, the quantity of the hydroxy-terminated polydiene (such as HTPB) can be 20-50 wt %, for example, 20 wt %, 25 wt %, 30 wt %, 35 wt %, 40 wt %, 45 wt % or 50 wt %.

The SBS rubber can be commercially available, for example, under the trade designation "Kraton D1101K" from the company Kraton, which contains a polystyrene block of about 16 wt % and contains a diblock of about 31 wt %. The binder composition can contain SBS rubber of about 5-35 wt %. For example, calculated relative to the weight of the binder composition, the quantity of the SBS rubber can be 5 wt %, 10 wt %, 15 wt %, 20 wt %, 25 wt %, 30 wt %, 35 wt %.

In the binder composition of the present disclosure, the total quantity of the flexibilizer is not more than 65 wt %. Preferably, the binder composition contains the flexibilizer with the total quantity between 10 and 65 wt %. For example, calculated relative to the weight of the binder composition, the total quantity of the flexibilizer is 10 wt %, 15 wt %, 20 wt %, 25 wt %, 30 wt %, 35 wt %, 40 wt %, 45wt %, 50 wt %, 55 wt %, 60 wt %, 65 wt %.

Tackifying Resin

The tackifying resin capable of being used for the present disclosure contains high-Tg tackifying resin with Tg being at least 20° C. and low-Tg tackifying resin with Tg being not more than 0° C.

The high-Tg tackifying resin has Tg of at least 20° C., and thus is usually solid at room temperature, preferably, the Tg is at least 40° C. or 60° C., and more preferably 85° C. or higher. Exemplary high-Tg tackifying resin comprises terpene, aliphatic series or aromatic series-modified hydrocarbons with 5-9 carbon atoms and abietate. In some embodiments, as the compatibility with the acrylic acid copolymer is reduced along with the increment of the molecular weight of the hydrocarbons, the hydrocarbons with a lower molecular weight can be preferably selected. In some embodiments, the weight mess average molecular weight Mw of the high-Tg tackifying resin is between 500 and 2000. The weight average molecular weight of the high-Tg tackifying resin in some embodiments is not more than 1500, is not more than 1000 in some embodiments and even not more than 800 in some embodiments.

The low-Tg tackifying resin has Tg which is not more than 0° C., for example, not more than −10° C. or even not more than −20° C. Generally speaking, as the compatibility with the acrylic acid copolymer is reduced along with the increment of the molecular weight, compounds with lower molecular weight can be preferably selected. Exemplary low-Tg tackifying resin comprise terpene phenolic resin, terpene, aliphatic series or aromatic series-modified hydrocarbons with 5-9 carbon atoms and abietate. In some embodiments, the weight mess average molecular weight Mw of the low-Tg tackifying resin is between 300 and 1500. The weight average molecular weight Mw of the low-Tg tackifying resin in some embodiments is not more than 1000, is not more than 800 in some embodiments and even not more than 500 in some embodiments.

Preferably, in the binder composition, weight ratio of the high-Tg tackifying resin to the low-Tg tackifying resin is 1:1 to about 8:1, more preferably 2:1 to 4:1. The binder composition contains the tackifying resin with the total quantity in a range of 30-45 wt %. For example, calculated relative to the weight of the binder composition, the total quantity of the tackifying resin is 30 wt %, 35 wt %, 40 wt %, 45 wt %.

Curing Agent

The curing agent capable of used for the present disclosure is an isocyanate curing agent. The isocyanate curing agent comprises those curing agents with at least 2 isocyanate functional groups generally used in the art, for example, diisocyanate and triisocyanate. For example, proper diisocyanate examples comprise aromatic diisocyanate, for example 2,6-toluene diisocyanate, 2,5-toluene diisocyanate, 2,4-toluene diisocyanate, metaphenylene-toluene diisocyanate, p-phenylene diisocyanate, methylene bis(o-chlorphenyl diisocyanate), methylene diphenylene-4,4'-diisocyanate, polycarbodiimide-modified methylene diphenylene diisocyanate, (4,4-diisocyanato-3,3',5,5'-tetraethyl)diphenylmethane, 4,4-diisocyanato3,3'-dimethoxy biphenyl(o-dianisidine diisocyanate), 5-Cl-2,4-toluene diisocyanate and 1-chloromethyl-2,4-diisocyanato benzene, aromatic-aliphatic diisocyanate (for example, m-xlylene diisocyanate and tetramethyl-m-xlylene diisocyanate), aliphatic diisocyanate (for example, 1,4-diisocyanato butane, 1,6-diisocyanato hexane, 1,12-diisocyanato dodecane and 2-methyl-1,5-diisocyanato pentane) and cyclic aliphatic diisocyanate (for example, methylene dicyclohexylidene-4,4-diisocyanate, 3-diisocyanato methyl-3,5,5-trimethyl cyclohexyl isocyanate (isophorone diisocyanate) and cyclohexylidene-1,4-diisocyanate).

In the binder composition of the present disclosure, the curing agent provides the crosslinking of the acrylic acid copolymer and the flexibilizer (for example, the hydroxy-terminated polybutadiene). Use level of the curing agent is determined according to specific application requirements and systems, generally speaking, if the quantity of the curing agent is too much, self-crosslinking of the acrylic acid copolymer is caused; otherwise, if the quantity of the curing agent is too less, polar functional groups of the flexibilizer (for example, hydroxy groups of the hydroxy-terminated polybutadiene) are left, which results in decrease of viscosity of the system. Therefore, the quantity of the curing agent should be the quantity capable of effectively curing the binder composition. In the binder composition, calculated relative to the weight of the acrylic acid copolymer, the quantity of the isocyanate curing agent is generally not more than 3 wt %, for example, 1 wt %, 1.25 wt %, 1.5 wt %, 2 wt %, 2.5 wt %, 3 wt %. Relative to the weight of the flexibilizer containing the polar functional groups selected from hydroxyl groups, carboxyl groups and amino groups (for example, the hydroxy-terminated polybutadiene), the quantity of the isocyanate curing agent is usually at least 5 wt %.

The binder composition of the present disclosure can optionally contain other additives, such as white pigment and the like which depends on an application condition.

In one embodiment, the binder composition of the present disclosure contains: the acrylic acid copolymer of 20-50 wt %, the flexibilizer with the total quantity being not more than 65wt % (preferably 10-65 wt %), the tackifying resin with the total quantity being 30-45wt % and the isocyanate curing agent with the quantity being capable of effectively curing the composition (preferably from 0 to not more than 3 wt % of the weight of the acrylic acid copolymer). Preferably, the flexibilizer contains the combination of hydroxy-terminated polybutadiene and SBS rubber, the quantity of the hydroxy-terminated polybutadiene is preferably 20-50 wt % of the weight of the acrylic acid copolymer, the SBS rubber is preferably 5-35 wt % of the weight of the binder composition, and the quantity of the isocyanate curing agent is preferably at least 5 wt % of the weight of the hydroxy-terminated polybutadiene.

Binder Product and Preparation Method

The binder product of the present disclosure comprises a binder layer formed by curing at least a part of the binder composition of the present disclosure. Common curing conditions in the art can be adopted, through certain temperature and time, isocyanic acid radicals in the isocyanate curing agent react with reactive functional groups in the system such as the hydroxyl groups/carboxyl groups/amino groups to form carbamate/amide/carbamido groups, thereby, polymer chains are at least partially crosslinked, and the composition is cured.

The binder product can comprise a carrier for carrying the binder layer, the binder layer is carried on one side of the carrier, or the binder layers are respectively carried on two opposite sides of the carrier. The carrier can contain an elastomer with a non-polar carbon chain, for example, SBS, polystyrene-ethylene-butadiene-styrene (SEPS) elastomer and/or polystyrene-isoprene-styrene (SIS) elastomer, isocyanate-crosslinked HTPB.

The binder product can also comprise an isolation layer, and the isolation layer covers the exposed surface of the binder layer. In this way, when not in use, the isolation layer can achieve an action of protecting the binder layer; while when in use, the isolation layer can be peeled to expose the binder layer thereunder.

The isolation layer can use any proper isolation lining. Proper examples of the isolation lining comprise paper, such as release paper (for example, PCK release paper coated with polyethylene) or polymer film, for example polyethylene, polypropylene or polyester. At least one surface of the lining can be treated by a parting agent (for example, organosilicone, fluoride-containing polymer and other isolation materials with low surface energy), thus forming the isolation lining.

Tested by an initial viscosity test standard PSCT-6, ratio of the initial viscosity under a non-pulling state of the binder to the initial viscosity when the binder is pulled to a strain of 300% of the present disclosure is more than 3, preferably more than 5 and even 6 or 7 or higher.

After being aged for 72 hours under the condition of 65° C. and relative humidity of 95%, the binder of the present disclosure is tested according to the initial viscosity test standard PSCT-6, the ratio of the initial viscosity of the binder under the non-pulling condition to the initial viscosity of the binder when being pulled to the strain of 300% is more than 2.4, preferably more than 5 and even 6 or 7 or higher.

The binder product of the present disclosure can be in a single face or double face adhesive tape manner.

In one embodiment, the adhesive tape of the present disclosure comprise: a carrier containing an elastomer, and a binder layer positioned at one side or two opposite sides of the carrier, the binder layer is formed by a binder composition and the binder composition contains:
- an acrylic acid copolymer of 20-50 wt %, containing a (methyl)acrylate monomer unit and a vinyl carboxylic acid comonomer unit of 3-8 wt %;
- a flexibilizer of 10-65 wt %, containing combination of hydroxy-terminated polybutadiene and SBS rubber;
- a tackifying resin of 30-45 wt %, containing high-Tg tackifying resin with Tg being at least 20° C. and low-Tg tackifying resin with Tg being not more than 0° C., wherein the weight ratio of the high-Tg tackifying resin and the low-Tg tackifying resin is 1:1 to 1:8; and
- an isocyanate curing agent, wherein the quantity of the isocyanate curing agent is not more than 3 wt % of the weight of the acrylic acid copolymer and is at least 5 wt % of the weight of the hydroxy-terminated polybutadiene.

Preferably, the number average molecular weight Mn of the acrylic acid copolymer is lower than 500,000 and Tg is lower than −30° C.

Preferably, the hydroxyl content of the hydroxy-terminated polybutadiene is 1-1.5 mmol/g, the number average molecular weight Mn is 2300-4500 and calculated relative to the weight of the acrylic acid copolymer, the quantity of the hydroxy-terminated polybutadiene is 20-50 wt %.

Preferably, the binder composition contains the SBS rubber of 5-35 wt %.

Preferably, Tg of the high-Tg tackifying resin is at least 85° C., the Tg of the low-Tg tackifying resin is not more than −20° C., and the weight ratio of the high-Tg tackifying resin and the low-Tg tackifying resin is preferably 2:1 to 4:1.

Preferably, the elastomer is selected from SBS, SEPS, SIS, and isocyanate-crosslinked hydroxy-terminated polybutadiene.

FIG. 1 shows a schematic diagram of one embodiment of the binder product of the present disclosure. The binder product comprises a carrier 1, binder layers 2 positioned at upper and lower sides of the carrier 1 and an isolation layer 3 covering the binder layer 2.

The present disclosure also provides a method for preparing the binder product, which comprises the following steps: providing the binder composition of the present disclosure positioned in a liquid medium, and obtaining coating liquid; coating the coating liquid on one side or two opposite sides of the carrier, and forming a coating; and curing at least a part of the coating and forming a binder layer.

The liquid medium can be any proper solvent, and is commonly an organic inert solvent, namely, an organic solvent which does not react with any component in the binder composition, and examples thereof comprise but are not limited to methylbenzene. The solid content of the coating liquid is determined according to a formula of the binder and the coating method, and is usually within a range of 10-50 wt %, and more typically 20-40 wt %, for example 37-40 wt %. The carrier contains an elastomer with a non-polar carbon chain, for example, SBS, SEPS and/or SIS.

The coating liquid can be coated on the carrier by adopting a common coating method and device adopted in the art. For example, these methods comprise rod coating, blade coating, spin coating, roller coating, extruding coating, curtain coating and the like.

The thickness of the coating or binder layer depends on application, for example is at least about 15 microns. The thickness of the carrier is above 10 microns, for example 40 microns. The total thickness of the binder (for example a double face adhesive tape) is below 0.1 mm. But according to application requirements, theses thicknesses can be higher or lower.

Method for Bonding Base Materials and Obtained Assembly

The present disclosure provides a method for removing a bonded base material, which comprises the following steps: bonding the binder product which can be removed by pulling on at least a part of the surface of a first base material, wherein, the binder product comprises a carrier and a binder layer positioned at one side or two opposite sides of the carrier, and the binder layer is formed by curing at least a part of the binder composition of the present disclosure; and contacting the second base material with the binder layer to bond a second base material with the first base material by the binder layer, and leaving a handle capable of being held by a user.

Under the condition that the binder product also comprises an isolation layer, the method also comprises: before bonding, removing the isolation layer to expose the binder layer.

The method also comprises pulling by holding the handle, thereby pulling and removing the binder product from the first base material and/or the second base material. When a part is repaired and replaced, a part can be easily detached as required by such pulling removing operation. An included angle between a pulling direction and the surface of the first base material and/or the second base material is in a range of 0-90°, for example, more than 35°, more than 50° and more than 70°. In electronics industry, due to the limitation of an operation space, a large pulling removing angle is particularly useful.

The present disclosure also provides an assembly, comprising a first base material, a second base material and a binder layer for bonding the first base material and the second base material together, wherein the binder layer is formed by curing at least a part of the binder composition of the present disclosure.

The binder of the present disclosure is suitable for a base material with low energy (20-35 dyne), and is suitable for a base material with high surface energy (higher than 35 dyne). For example, the surface energy of the base material is possibly in a range of 20 dyne to 65 dyne. The surface energy can be determined according to an international standard ISO8296.

The presently disclosed binder composition is suitable for the base materials, comprising: metal, ceramic, polymer, glass and various ink surfaces. Therefore, the presently disclose binder composition can be widely used in home furnishing, electronic industrial and other fields. Since the presently disclosed binder composition can be removed from a bonded base material by pulling, it is particularly suitable for smartphones, tablet computers and other newly-developing electronic fields, for example, can be used for mounting and detaching (repairing or replacing) of batteries or electronic parts (such as a touch screen).

Without being bound by theory, when selecting the type and ratio of a specific acrylic acid copolymer, in combination with a flexibilizer and a high-Tg and low-Tg tackifying resin, an acrylic acid binder with a wider Tg range can be prepared and can provide excellent bonding force for the base materials with different surface energies. By performing 180° peeling bonding strength test according to ASTM D3330 (further described below), the bonding strength of the presently disclosed binder composition is at least 0.5 N/mm, preferably at least 0.7 N/mm, and even 1 N/mm or higher. According to an anti-falling performance test (further described below), falling height when the binder fails represents the bonding strength, the bonding strength of the presently disclosed binder composition can be more than 15 cm, preferably more than 20 cm, and even 25 cm, 35 cm or higher.

The binder of the present disclosure has the property of "reducing the bonding strength by pulling (pulling removing performance)", therefore, the binder can be pulled and removed. The lower the bonding strength of the binder in the pulling process is, the harder the adhesive tape is damaged in a bonding removing process. By performing a pulling strength test according to ASTM D3579 (further described below), the breakage pulling strength of the binder of the present disclosure is more than 20 MPa, and preferably more than 30 MPa; elongation at break is more than 750% and preferably more than 1000%. By performing a viscosity test according to PSTC-6 (further described below), the ratio of the initial viscosity of the binder under a non-pulling state to the initial viscosity when the binder is pulled to a strain of 300% is more than 3,1 preferably more than 5 and even 6 or 7 or higher. According to a pulling removal test (further described below), the pulling removing ratio of the binder of the present disclosure is more than 80%, preferably more than 90% and 95% and even as high as 100%.

The binder of the present disclosure also has obviously improved dampness/heat/aging resistance. After being aged for 72 hours under the condition of 65° C. and relative humidity of 95%, the binder of the present disclosure can still basically keep the bonding strength and pulling removing performance.

Exemplary embodiments of the present disclosure are described in a representative but non-limitative manner. One of skill in the art can design other various transformed modes and embodiments, which are covered by the scope and spirit of the present disclosure.

Technical characteristics of respective aspects and respective embodiments of the present disclosure can be mutually combined, for example, respective characteristics related to the binder composition are correspondingly suitable for the binder product and assembly. Patent documents and publications cited by the text are incorporated herein by reference with its all disclosed content, which is similar to the fact that each part is independently incorporated herein. In addition, although some embodiments and parts are numbered with "first" and "second" for description, it should be understood that these numbers are used for facilitating description without implying priority. In the text, the "binder" and the "binder product" are interchangeable; in addition, when content percentage is mentioned, the content percentage is based on solid content, namely, the quantity of the solvent is not calculated.

In the description and claims of the application, "one", "the", "said" used in front of certain noun or conditions without obvious quantity comprise the condition in which more than one referent exists unless the content apparently represents other meanings. For example, the condition that the composition containing the flexibilizer comprises the condition that one or more flexibilizers are used in the composition.

Unless otherwise stated, it should be understood that all numbers for presenting the feature size, quantity and physical properties used in the text are modified by the term "about" under all conditions. Therefore, unless otherwise stated, values listed in the description and claims are all approximate values, those skilled in the art can seek and obtain needed features by using the instruction content disclosed by the text and properly change these approximate values. In addition, unless specifically indicated, a numerical value range represented by end values comprise the end values, and all sub ranges and numerical values in the range (for example, 20-50 wt % comprising 20 wt %, 30 wt %, 50 wt %, 20-35 wt % and the like).

Unless otherwise indicated, all parts, percentage, ratios and the like in the embodiments and rest parts of the text are calculated according to weight.

Following is a listing of non-limiting embodiments according to the present disclosure:

Embodiment 1 A binder composition, comprising:
  an acrylic acid copolymer, comprising a (methyl)acrylate monomer unit and a vinyl carboxylic acid comonomer unit;
  a flexibilizer, comprising a functional group selected from a hydroxide radical, a carboxyl group and an amino group, wherein the flexibilizer has a non-polar carbon chain;
  a tackifying resin, comprising a high-Tg tackifying resin with a Tg of at least 20° C. and a low-Tg tackifying resin with a Tg of not more than 0° C.; and
  an isocyanate curing agent.

Embodiment 2 The binder composition according to Embodiment 1, wherein a number average molecular weight Mn of the acrylic acid copolymer is lower than 500,000 g/mol and the Tg is lower than −30° C.

Embodiment 3 The binder composition according to Embodiment 1, wherein the acrylic acid copolymer comprises the vinyl carboxylic acid copolymer unit in the amount ranging from 3 wt % to 8 wt %.

Embodiment 4 The binder composition according to Embodiment 1, wherein the binder composition comprises the acrylic acid copolymer in the amount ranging from 20 wt % to 50 wt %.

Embodiment 5 The binder composition according to Embodiment 1, wherein the non-polar carbon chain of the flexibilizer is derived from unsaturated alkene.

Embodiment 6 The binder composition according to Embodiment 1, wherein the flexibilizer comprises the combination of hydroxy-terminated polybutadiene and SBS rubber.

Embodiment 7 The binder composition according to Embodiment 6, wherein a hydroxyl content of the hydroxy-terminated polybutadiene is at least 1 mmol/g.

Embodiment 8 The binder composition according to Embodiment 6, wherein a number average molecular weight Mn of the hydroxy-terminated polybutadiene is between 2300 g/mol and 4500 g/mol.

Embodiment 9 The binder composition according to Embodiment 6, wherein the hydroxyl-terminated polybutadiene is present in an amount ranging from 20 wt % to 50 wt % based on the weight of the acrylic acid copolymer.

Embodiment 10 The binder composition according to Embodiment 6, wherein the binder composition comprises the SBS rubber in an amount ranging from 5 wt % to 35 wt %.

Embodiment 11 The binder composition according to Embodiment 1, wherein the binder composition comprises the flexibilizer in an amount of not more than 65 wt %.

Embodiment 12 The binder composition according to Embodiment 11, wherein the binder composition comprises the flexibilizer in an amount ranging from 10 wt % to 65 wt %.

Embodiment 13 The binder composition according to Embodiment 1, wherein the Tg of the high-Tg tackifying resin is at least 85° C. and the Tg of the low-Tg tackifying resin is not more than −20° C.

Embodiment 14 The binder composition according to Embodiment 1, wherein a weight ratio of the high-Tg tackifying resin to the low-Tg tackifying resin ranges from 1:1 to 8:1.

Embodiment 15 The binder composition according to Embodiment 1, wherein a weight ratio of the high-Tg tackifying resin to the low-Tg tackifying resin ranges from 2:1 to 4:1.

Embodiment 16 The binder composition according to Embodiment 1, wherein the binder composition comprises the tackifying resin in an amount ranging from 30 wt % to 45 wt %.

Embodiment 17 The binder composition according to Embodiment 1, wherein the isocyanate curing agent is present in an amount ranging from more than 0 wt % to not more than 3 wt % based on the weight of the acrylic acid copolymer.

Embodiment 18 The binder composition according to Embodiment 6, the isocyanate curing agent is present in an amount of at least 5 wt % based on the weight of the hydroxy-terminated polybutadiene.

Embodiment 19 The binder composition according to any one of Embodiments 1 to 18, comprising: the acrylic acid copolymer in an amount ranging from 20 wt % to 50 wt %, the flexibilizer in an amount ranging from 10 wt % to 65 wt %, the tackifying resin in the amount ranging from 30 wt % to 45 wt %, and the isocyanate curing agent in the amount ranging from more than 0 wt % to not more than 3 wt % based on the weight of the acrylic acid copolymer.

Embodiment 20 A binder product, comprising a binder layer formed by curing at least a part of the binder composition in any one of Embodiments 1 to 19.

Embodiment 21 The binder product according to Embodiment 20, further comprising:
a carrier, wherein the binder layer is disposed on one side of the carrier, or the binder layers are respectively disposed on two opposing sides of the carrier; and
an isolation layer optionally covering an exposed surfaced of the binder layer.

Embodiment 22 The binder product according to Embodiment 21, wherein the carrier contains an elastomer with a non-polar carbon chain.

Embodiment 23 The binder product according to Embodiment 22, wherein the elastomer is selected from SBS, SEPS, SIS and isocyanate-crosslinked hydroxy-terminated polybutadiene.

Embodiment 24 The binder product according to Embodiment 20, wherein when a test is performed according to an initial viscosity test standard PSTC-6, a ratio of an initial viscosity of the binder product under a non-pulling state to an initial viscosity when the binder product is pulled to a strain of 300% is more than 3.

Embodiment 25 The binder product according to Embodiment 20, wherein when a test is performed according to an initial viscosity test standard PSTC-6, a ratio of an initial viscosity of the binder product under a non-pulling state to an initial viscosity when the binder product is pulled to a strain of 300% is more than 5.

Embodiment 26 The binder product according to Embodiment 24, wherein after being aged for 72 hours under the condition of 65° C. and relative humidity of 95%, a test is performed according to an initial viscosity test standard PSTC-6, and a ratio of an initial viscosity of the binder product under a non-pulling state to an initial viscosity when the binder product is pulled to a strain of 300% is more than 2.4.

Embodiment 27 The binder product according to Embodiment 25, wherein after being aged for 72 hours under the condition of 65° C. and relative humidity of 95%, a test is performed according to an initial viscosity test standard PSTC-6, and a ratio of an initial viscosity of the binder product under a non-pulling state to an initial viscosity when the binder product is pulled to a strain of 300% is kept more than 5.

Embodiment 28 A method for preparing a binder product, comprising following steps:
providing the binder composition according to any one of Embodiments 1 to 19 positioned in a liquid medium, and obtaining a coating liquid;
coating the coating liquid on one side or two opposite sides of a carrier, and forming a coating; and
curing at least a part of the coating and forming a binder layer.

Embodiment 29 The method according to Embodiment 28, wherein the liquid medium is selected from an organic inert solvent and the carrier comprises an elastomer with a non-polar carbon chain.

Embodiment 30 An adhesive tape, comprising:
a carrier containing an elastomer, and
a binder layer disposed on one side or two opposing sides of the carrier, the binder layer is formed by the binder composition and the binder composition comprises:
an acrylic acid copolymer in an amount ranging from 20 wt % to 50 wt %, comprising a (methyl)acrylate monomer unit and a vinyl carboxylic acid comonomer unit in an amount ranging from 3 wt % to 8 wt %;
a flexibilizer in an amount ranging from 10 wt % to 65 wt %, comprising a combination of hydroxy-terminated polybutadiene and SBS rubber;
a tackifying resin in an amount ranging from 30 wt % to 45 wt %, comprising a high-Tg tackifying resin with a Tg of at least 20° C. and a low-Tg tackifying resin with a Tg of not more than 0° C., wherein a weight ratio of the high-Tg tackifying resin and the low-Tg tackifying resin ranges from 1:1 to 1:8; and
an isocyanate curing agent, wherein the isocyanate curing agent is present in an amount of not more than 3 wt % of the weight of the acrylic acid copolymer and in an amount that is least 5 wt % of the weight of the hydroxy-terminated polybutadiene.

Embodiment 31 The adhesive tape according to Embodiment 30, wherein the acrylic copolymer has a number average molecular weight Mn lower than 500,000 g/mol and a Tg lower than −30° C.

Embodiment 32 The adhesive tape according to Embodiment 30 or 31, wherein a hydroxyl content of the hydroxy-terminated polybutadiene is between 1 mmol/g to 1.5 mmol/g, number average molecular weight ranges from 2300 g/mol to 4500 g/mol, and the hydroxyl-terminated polybutadiene is present in an amount ranging from 20 wt % to 50 wt % based on the weight of the acrylic acid copolymer;

wherein the binder composition comprises the SBS rubber in an amount ranging from 5 wt % to 35 wt %.

Embodiment 33 The adhesive tape according to any one of Embodiments 30 to 32, wherein the Tg of the high-Tg tackifying resin is at least 85° C. and the Tg of the low-Tg tackifying resin is not more than −20° C., and a weight ratio of the high-Tg tackifying resin to the low-Tg tackifying resin ranges from 2:1 to 4:1.

Embodiment 34 The adhesive tape according to any one of Embodiments 30 to 33, wherein the elastomer is selected from SBS, SEPS, SIS and isocyanate-crosslinked hydroxy-terminated polybutadiene.

Embodiment 35 An assembly, comprising a first base material, a second base material and a binder layer for bonding the first base material and the second base material together, wherein the binder is formed by curing at least a part of the binder composition according to one of Embodiments 1 to 19.

Embodiment 36 The assembly according to Embodiment 35, wherein, the first base material and the second base material are respectively independently selected from low surface energy base materials with a surface energy ranging from 20dyne to 35 dyne and high surface energy base materials with a surface energy higher than 35 dyne.

Embodiment 37 The assembly according to Embodiment 35, wherein the first base material and the second base material are respectively independently selected from metal, ceramic, polymer, glass and ink surface.

Embodiment 38 The assembly according to any one of Embodiments 35 to 37, wherein the binder layer can be removed from the first base material and/or the second base material by pulling.

EXAMPLES

Test Method

Pulling strength test: the pulling strength test is performed according to an international standard ASTM D3759, the instrument for the test is an Instron (4465 type) pulling instrument, a chuck speed is 304.8 mm/min, and the size of a binder sample is 12.7 mm*25.4 mm.

180° peeling bonding strength test: the 180° peeling bonding strength test is performed according to an international standard ASTM D3330, the instrument for the test is an IMASS SP-200 sliding/peeling tester (obtained from IMASS, Inc., Accord, Mass.), the test speed is 12 inch/min.

Initial viscosity test: according to a test standard PSTC-6, a rolling ball method is adopted for the initial viscosity test (measuring surface viscosity). Main instruments for test comprise: a slope, a steel ball and a regular stainless base material. The steel ball of 5.6 g (diameter being 11 mm) rolls onto a binder sample along the slope (height: 65 mm, slant angle: 21.5°). As the binder has a bonding function and obstructs rolling of the steel ball till stopping rolling of the steel ball. The distance that the steel ball rolls on the surface of the binder sample (called as "steel ball rolling distance" below) is used for measuring the initial viscosity. Therefore, the initial viscosity is inversely proportional to the steel ball rolling distance.

The steel ball rolling distances of the binder sample at the initial state and when being pulled to the strain of 300% are respectively tested and are respectively marked as $L_{ini}$ and $L_{300\%}$. Therefore, the ratio of the initial viscosity of the binder under a non-pulling state to the initial viscosity when the binder is pulled to a strain of 300% is $L_{300\%}/L_{ini}$.

Pulling removing performance test: two test blocks are bonded by using a binder sample of 90 mm*20 mm*0.1 mm (length*width*height), a handle is left, an Instron (4465 type) pulling instrument is adopted to perform the pulling removing performance test on the binder sample under the condition that the chuck speed is 12 inch/min at a pulling angle of 90°. The pulling removing reliability is measured by the percentage (%) of a completely removed sample relative to the total tested sample. In the embodiments, the pulling removing performance test is performed under two conditions respectively: 1) an original sample; 2) a sample which is aged for 72 hours under the condition of 65° C. and relative humidity (RH) of 95%.

Figure 2:
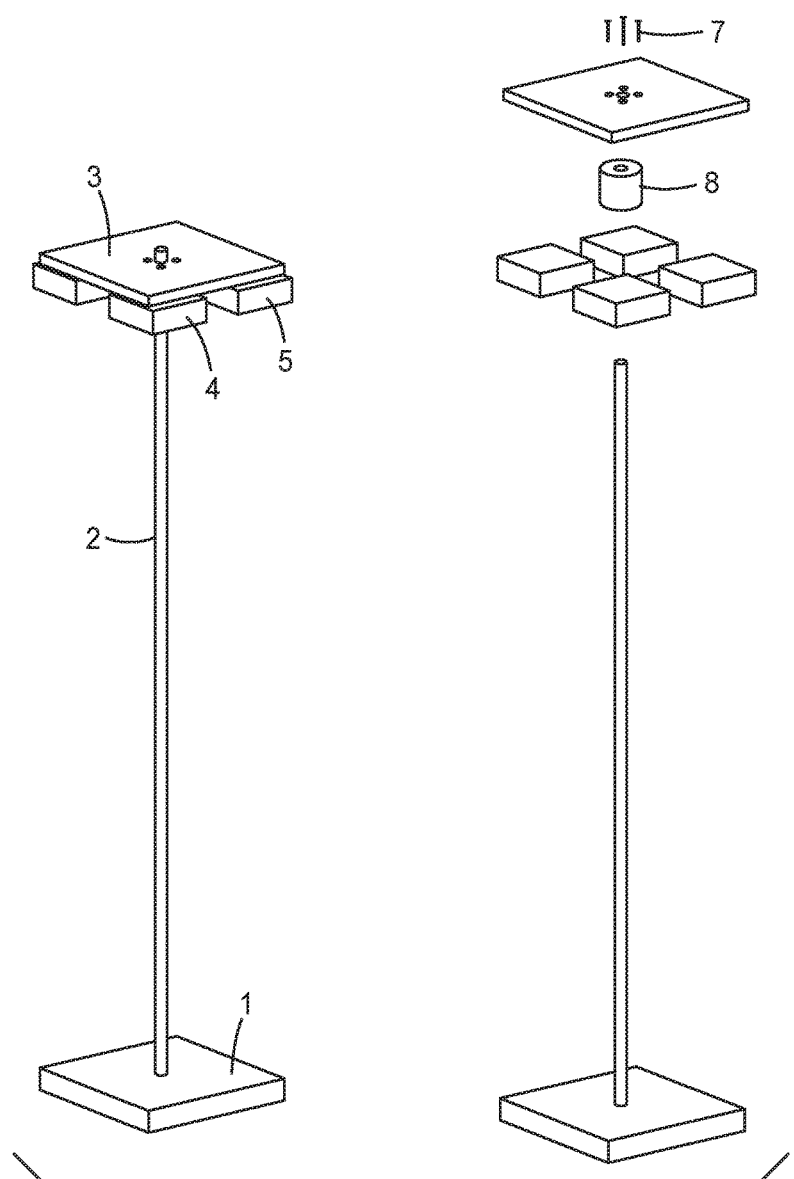
FIG. 2 is a schematic diagram of a device for testing anti-falling performance of the present disclosure.

Anti-falling performance test: a device as shown in FIG. 2 is adopted, and a binder sample of 60 mm*20 mm is adopted to perform the anti-falling performance test. The device comprises a base 1, a support rod 2 supported by the base 1, and a support block 6 positioned at the top end of the support rod 2, a bottom plate 3 is fixed on the support block 6 by fixing screws 7, and 4 weights of 0.5 Kg are bonded on the bottom plate 3 by the binder sample. Beginning from an initial height of 5 cm, the falling height is increased step by step by an increment of 5 cm every time, the height of failure (short for HOFF) when the sample is failed is observed. If any part of the binder sample shows failure/peeling, the failure is determined.

Material Instruction

The material used by the following embodiments and comparative examples is as follows:

| Material | Instruction |
| --- | --- |
| Sk-Dyne 1717 DT | acrylic acid copolymer, obtained from Soken Kagaku |
| Qilong HTPB | hydroxy-terminated polybutadiene, Mn: 2300:2800, hydroxy group content: 1 mmol/g, obtained from Qilong Chemical |
| RegaliteC8010 | Hydrogenated liquid HC resin, obtained from Eastman |
| Kraton D1101K | SBS, containing polystyrene block of 16% and diblock of about 31 wt %, obtained from Kraton |
| Piccolyte A135 | terpene resin, softening point: 135° C., obtained from PINOVA |
| Desmodur L-75 | TDI crosslinking agent, obtained from Bayer |
| Thermogrip H2187 | SBS resin, obtained from Bostik |
| Kraton G1657 | SEBS, containing polystyrene block of 13% and diblock of about 36 wt %, obtained from Kraton |
| Kraton G1650 | SEBS, containing polystyrene block of 30% and no diblock, obtained from Kraton |
| Regalite S 1100 | Partially hydrogenated liquid HC resin, softening point: 100° C., 100 obtained from Eastman |
| Regalite R 1010 | Hydrogenated liquid HC resin, obtained from Eastman |

Embodiments 1-6

According to constitution of Table 1, binder samples of the embodiments 1-6 are prepared. A preparation process of these binder samples is as follows: besides the TDI crosslinking agent, the rest components are added in a glass wild-mouth bottle; methylbenzene is added to prepare a solution with the solid content of 37-40%, the wild-opening bottle is placed on a roller overnight for mixing; before coating, an isocyanate crosslinking agent is added into the wild-opening bottle, and uniform mixing is performed to obtain coating liquid; the coating liquid is coated on upper and lower sides of an SBS carrier (D1101K, obtained from Kraton, US) which is 40 microns thick by a blade coating machine which is 15 cm wide, and intervals of the coating machine are set, so that binder layers which are 30 microns thick are formed at each side after drying; the samples are placed in an oven, and are dried for 10-15 minutes under 90° C. to obtain a binder sample which is an adhesive tape with the total thickness of 100 microns. Before test, the binder sample is covered by an isolation lining (PCK release paper coated with polyethylene), and is preserved in a room of 23° C. and RH of 50% for 24 hours, then the isolation lining is peeled for performance test.

TABLE 1

| constitution of binder | | | | | | |
|---|---|---|---|---|---|---|
| Material (wt %)/ embodiments | 1 | 2 | 3 | 4 | 5 | 6 |
| Sk-Dyne 1717 DT | 50 | 20 | 40 | 20 | 15 | 40 |
| Qilong HTPB | 10 | 10 | 10 | 10 | 5.25 | 14.75 |
| Regalite C8010 | 10 | 10 | 20 | 5 | 5 | 10 |
| Kraton D1101K | 5 | 0 | 5 | 0 | 0 | 10 |
| Piccolyte A135 | 24.5 | 24.5 | 24.5 | 24.5 | 24.5 | 24.5 |

TABLE 1-continued

| constitution of binder | | | | | | |
|---|---|---|---|---|---|---|
| Material (wt %)/ embodiments | 1 | 2 | 3 | 4 | 5 | 6 |
| Desmodur L-75 | 0.5 | 0.5 | 0.5 | 0.5 | 0.25 | 0.75 |
| Thermogrip H2187 | 0 | 35 | 0 | 40 | 50 | 0 |

The binder samples of the embodiments 1-6 are tested according to the test method described above, and a test result is as shown in Table 2 and Table 3 below.

Comparative Example 1

According to the manner described in embodiments 1-6, by adopting a formula in patent document US2008/0271846A1, Kraton G1657 of 70 g, Kraton G1650 of 30 g, Regalite S1100 of 65 g and Regalite R1010 of 85 g are prepared into a binder sample of the comparative example 1. Test is performed according to a method same as that in the embodiments 1-6, and the test result is as shown in Table 2 and Table 3 below

TABLE 2 main performance indexes of the binder at room temperature

| | | | 180° peeling bonding strength test N/mm | | | | Rolling ball test mm | | | Pulling removing performance test force(N)/ reliability(%) | | | | HOFF cm | |
|---|---|---|---|---|---|---|---|---|---|---|---|---|---|---|---|
| | Pulling | Elon- | | | | | | | | LSE + AA | | HSE + AA | | LSE + | HSE + |
| Examples | strength MPa | gation % | SS | AA | LSE | HSE | $L_{ini}$ | $L_{300\%}$ | $L_{300\%}/L_{ini}$ | N | % | N | % | AA | AA |
| Embodiment 1 | 31.5 | 1105 | 1.1 | 0.89 | 0.81 | 1.03 | 4 | 27 | 6.75 | 5.5 | 100 | 5.8 | 100 | 35 | 45 |
| Embodiment 2 | 35 | 1080 | 0.93 | 0.74 | 0.75 | 0.81 | 5 | 38 | 7.6 | 4.117 | 100 | 4.367 | 100 | 25 | 30 |
| Embodiment 3 | 20 | 1100 | 0.91 | 0.75 | 0.66 | 0.8 | 3 | 9 | 3 | 5.1 | 80 | 5.3 | 80 | 15 | 30 |
| Embodiment 4 | 41.75 | 750 | 0.65 | 0.51 | 0.53 | 0.623 | 8 | 35 | 4.375 | 4.65 | 100 | 4.886 | 100 | 15 | 15 |
| Embodiment 5 | 32 | 820 | 0.5 | 0.42 | 0.67 | 0.45 | 9 | 45 | 5 | 4.2 | 80 | 3.6 | 80 | 10 | 5 |
| Embodiment 6 | 35 | 1250 | 1 | 0.85 | 0.9 | 0.95 | 4 | 34 | 8.5 | 4.3 | 100 | 4.5 | 100 | 40 | 45 |
| Comparative example 1 | 15 | 1300 | 0.8 | 0.7 | 0.65 | 0.8 | 5 | 35 | 7 | 3.2 | 100 | 3.1 | 100 | 15 | 15 |

TABLE 3 main performance indexes of the binder after aging for 72 hours at high temperature and high humidity conditions (65° C., RH of 90%)

| | | | 180° peeling bonding strength test N/mm | | | | Rolling ball test mm | | | Pulling removing performance test force(N)/ reliability(%) | | | | HOFF cm | |
|---|---|---|---|---|---|---|---|---|---|---|---|---|---|---|---|
| | Pulling | Elon- | | | | | | | | LSE + AA | | HSE + AA | | LSE + | HSE + |
| Examples | strength MPa | gation % | SS | AA | LSE | HSE | $L_{ini}$ | $L_{300\%}$ | $L_{300\%}/L_{ini}$ | N | % | N | % | AA | AA |
| Embodiment 1 | 27.5 | 1008 | 1.2 | 0.95 | 0.83 | 1.3 | 3 | 21 | 7.00 | 4.3 | 90 | 4.7 | 90 | 35 | 40 |
| Embodiment 2 | 34.25 | 980 | 1.01 | 0.87 | 0.8 | 0.93 | 4 | 35 | 8.75 | 3.6 | 100 | 3.65 | 100 | 25 | 35 |
| Embodiment 3 | 16.75 | 930 | 0.96 | 0.79 | 0.67 | 0.9 | 3 | 7.3 | 2.43 | 3.3 | 60 | 3.75 | 50 | 20 | 30 |
| Embodiment 4 | 37.5 | 565 | 0.76 | 0.58 | 0.55 | 0.732 | 7 | 33 | 4.71 | 4.6 | 75 | 4.7 | 70 | 15 | 15 |
| Embodiment 5 | 28 | 670 | 0.55 | 0.4 | 0.72 | 0.5 | 8 | 36 | 4.5 | 4.5 | 50 | 3.6 | 70 | 10 | 10 |

TABLE 3-continued main performance indexes of the binder after aging for 72 hours at high temperature and high humidity conditions (65° C., RH of 90%)

| | | | 180° peeling bonding strength test N/mm | | | | Rolling ball test mm | | | Pulling removing performance test force(N)/ reliability(%) | | | | HOFF cm | |
|---|---|---|---|---|---|---|---|---|---|---|---|---|---|---|---|
| | | | | | | | | | | LSE + AA | | HSE + AA | | LSE + | HSE + |
| | Pulling strength | Elon- gation | | | | | | $L_{300\%}/$ | | | | | | | |
| Examples | MPa | % | SS | AA | LSE | HSE | $L_{ini}$ | $L_{300\%}$ | $L_{ini}$ | N | % | N | % | AA | AA |
| Embodiment 6 | 33 | 1090 | 1.1 | 0.9 | 1.1 | 1 | 4 | 32 | 8 | 4.5 | 100 | 4.5 | 100 | 45 | 45 |
| Comparative example 1 | 9 | 900 | 0.85 | 0.73 | 0.7 | 0.9 | 5 | 24 | 4.8 | 3.5 | 50 | 3.5 | 40 | 15 | 15 |

Noted: in Tables 2-3,
SS: stainless steel;
AA: anodized aluminum;
LSE: low surface energy base material (30-35 dyne);
HSE: high surface-energy base material (55-65 dyne), printing ink surface As shown in above tables, respective embodiments all have better bonding strength for base materials with high and low surface energies (as shown in the 180° peeling bonding strength test) and better anti-falling performance, show pulling strength superior to that of the comparative example 1, are still the same even after the severe aging test conditions. Meanwhile, they can be very easily pulled and removed (as shown in the rolling ball test result), the initial viscosity under certain pulling strain is obviously reduced, and the binder samples of the present disclosure show the pulling removing performance superior to that of the comparative example 1.

Therefore, the acrylic acid binder is suitable for bonding various base materials, comprising low-surface energy base materials and high-surface energy materials. The binder can provide sufficient bonding strength and the bonding strength thereof can be obviously reduced by pulling, so that in a pulling process, the bonding strength is reduced, pulling removing is easy to realize, and pulling bonding removal can be realized. In addition, the binder of the present disclosure also has the obviously improved aging resistance.

It will be obvious for those skilled in the art that various modifications and variations can be made to the present disclosure, without departing from the scope and spirit thereof.

What is claimed is:

1. A binder composition, comprising:
 an acrylic acid copolymer, comprising a (methyl)acrylate monomer unit and a vinyl carboxylic acid comonomer unit;
 a flexibilizer, wherein the flexibilizer comprises the combination of hydroxy-terminated polybutadiene and SBS rubber;
 a tackifying resin, comprising a high-Tg tackifying resin with a Tg of at least 20° C. and a low-Tg tackifying resin with a Tg of not more than 0° C.; and
 an isocyanate curing agent.

2. The binder composition according to claim 1, wherein a number average molecular weight Mn of the acrylic acid copolymer is lower than 500,000 g/mol and the Tg is lower than −30° C.

3. The binder composition according to claim 1, wherein the acrylic acid copolymer comprises the vinyl carboxylic acid comonomer unit in the amount ranging from 3 wt % to 8 wt %.

4. The binder composition according to claim 1, wherein the binder composition comprises the acrylic acid copolymer in the amount ranging from 20 wt % to 50 wt %.

5. The binder composition according to claim 1, wherein a hydroxyl content of the hydroxy-terminated polybutadiene is at least 1 mmol/g.

6. The binder composition according to claim 1, wherein a number average molecular weight Mn of the hydroxy-terminated polybutadiene is between 2300 g/mol and 4500 g/mol.

7. The binder composition according to claim 1, wherein the hydroxyl-terminated polybutadiene is present in an amount ranging from 20 wt % to 50 wt % based on the weight of the acrylic acid copolymer.

8. The binder composition according to claim 1, wherein the binder composition comprises the SBS rubber in an amount ranging from 5 wt % to 35 wt %.

9. The binder composition according to claim 1, wherein the binder composition comprises the flexibilizer in an amount of not more than 65 wt %.

10. The binder composition according to claim 9, wherein the binder composition comprises the flexibilizer in an amount ranging from 10 wt % to 65 wt %.

11. The binder composition according to claim 1, wherein the Tg of the high-Tg tackifying resin is at least 85° C. and the Tg of the low-Tg tackifying resin is not more than −20° C.

12. The binder composition according to claim 1, wherein a weight ratio of the high-Tg tackifying resin to the low-Tg tackifying resin ranges from 1:1 to 8:1.

13. The binder composition according to claim 1, wherein a weight ratio of the high-Tg tackifying resin to the low-Tg tackifying resin ranges from 2:1 to 4:1.

14. The binder composition according to claim 1, wherein the binder composition comprises the tackifying resin in an amount ranging from 30 wt % to 45 wt %.

15. The binder composition according to claim 1, wherein the isocyanate curing agent is present in an amount ranging from more than 0 wt % to not more than 3 wt % based on the weight of the acrylic acid copolymer.

16. The binder composition according to claim 1, wherein the isocyanate curing agent is present in an amount of at least 5 wt % based on the weight of the hydroxy-terminated polybutadiene.

* * * * *